United States Patent
Peleg et al.

(10) Patent No.: US 10,078,339 B2
(45) Date of Patent: Sep. 18, 2018

(54) MISSILE SYSTEM WITH NAVIGATION CAPABILITY BASED ON IMAGE PROCESSING

(71) Applicant: RAFAEL ADVANCED DEFENSE SYSTEMS LTD, Haifa (IL)

(72) Inventors: Omri Peleg, Haifa (IL); Eran Shimonovitz, Haifa (IL); Aviram Levy, Haifa (IL)

(73) Assignee: RAFAEL ADVANCED DEFENSE SYSTEMS LTD, Haifa (IL)

( * ) Notice: Subject to any disclaimer, the term of this patent is extended or adjusted under 35 U.S.C. 154(b) by 162 days.

(21) Appl. No.: 14/911,469

(22) PCT Filed: Jun. 15, 2014

(86) PCT No.: PCT/IL2014/050540
§ 371 (c)(1),
(2) Date: Feb. 11, 2016

(87) PCT Pub. No.: WO2015/022681
PCT Pub. Date: Feb. 19, 2015

(65) Prior Publication Data
US 2016/0195878 A1    Jul. 7, 2016

(30) Foreign Application Priority Data
Aug. 15, 2013    (IL) .......................... 227982

(51) Int. Cl.
*G05D 1/10*       (2006.01)
*F42B 15/01*      (2006.01)
(Continued)

(52) U.S. Cl.
CPC .............. *G05D 1/107* (2013.01); *F41G 7/007* (2013.01); *F41G 7/008* (2013.01); *F41G 7/2206* (2013.01);
(Continued)

(58) Field of Classification Search
CPC ...... G05D 1/107; G05D 1/0038; G01C 21/12; F41G 7/007; F41G 7/30; F41G 7/2213;
(Continued)

(56) References Cited

U.S. PATENT DOCUMENTS

| | | | | |
|---|---|---|---|---|
| 3,564,134 A | * | 2/1971 | Rue .......................... | G09B 9/48 244/190 |
| 4,396,903 A | * | 8/1983 | Habicht ................... | G06K 9/36 342/64 |

(Continued)

FOREIGN PATENT DOCUMENTS

| | | |
|---|---|---|
| DE | 4218600 A1 | 12/1993 |
| DE | 102007054950 A1 | 8/2009 |

(Continued)

OTHER PUBLICATIONS

Daniel D. Morris et al: "Uncertainty Modeling for Ptimal Structure From Motion" in: "Lecture Notes in Computer Science", Jan. 1, 2000, Springer Berlin Heidlberg, Berlin, Heidelberg, XP055167102, ISSN: 0302-9743, ISBN: 978-3-54-045234-8, vol. 1883, pp. 200-217, DOI: 10.1007/3-540-44480-7_13, *Abstract*.
(Continued)

*Primary Examiner* — Bernarr E Gregory
(74) *Attorney, Agent, or Firm* — Mark M. Friedman (57) ABSTRACT

The present invention relates to electro-optic guided missile systems and, in particular, it concerns systems and methods providing enhanced navigation capabilities based on ego-motion processing of seeker images. The missile system comprising: a missile; a seeker located at a nose portion of said missile, said seeker comprising an electro-optic imaging sensor; and a control arrangement for steering the missile along a flight path to a target, characterized in that the missile system further comprises: a navigation subsystem receiving images from said imaging sensor, said navigation subsystem being configured to: co-process a plurality (Continued)

of said images from said imaging sensor to derive ego-motion of said missile relative to a region viewed by said imaging sensor; derive from said ego-motion a calculated target direction from said missile to a target.

19 Claims, 2 Drawing Sheets

(51) Int. Cl.

| | |
|---|---|
| *F41G 7/20* | (2006.01) |
| *F41G 7/34* | (2006.01) |
| *G01C 21/12* | (2006.01) |
| *G01S 5/16* | (2006.01) |
| *F41G 7/00* | (2006.01) |
| *F41G 7/22* | (2006.01) |
| *G05D 1/00* | (2006.01) |
| *F41G 7/30* | (2006.01) |
| *F42B 15/00* | (2006.01) |

(52) U.S. Cl.
CPC ......... *F41G 7/2213* (2013.01); *F41G 7/2253* (2013.01); *F41G 7/2293* (2013.01); *F41G 7/30* (2013.01); *F41G 7/343* (2013.01); *F42B 15/01* (2013.01); *G01C 21/12* (2013.01); *G05D 1/0038* (2013.01); *G01S 5/16* (2013.01)

(58) Field of Classification Search
CPC ...... F41G 7/2293; F41G 7/2253; F41G 7/008; F41G 7/2206; F41G 7/343; F41G 7/22; G01S 5/16; G01S 7/491; G01S 7/412; F42B 15/01; G06K 9/36; G09B 9/48
See application file for complete search history.

(56) References Cited

U.S. PATENT DOCUMENTS

| | | | | |
|---|---|---|---|---|
| 4,992,797 | A | * | 2/1991 | Gjessing ................. G01S 7/412 342/190 |
| 5,208,757 | A | * | 5/1993 | Appriou .................. F41G 7/343 701/23 |
| 5,260,709 | A | * | 11/1993 | Nowakowski .......... F41G 7/007 |
| 5,323,987 | A | | 6/1994 | Pinson |
| 5,627,905 | A | | 5/1997 | Sebok et al. |
| 5,660,355 | A | * | 8/1997 | Waymeyer ................ F41G 7/22 |
| 7,083,139 | B2 | | 8/2006 | Broekaert |
| 2009/0125223 | A1 | | 5/2009 | Higgins et al. |
| 2010/0198514 | A1 | * | 8/2010 | Miralles ................. F41G 7/2253 |
| 2011/0071703 | A1 | | 3/2011 | Schoettl |

FOREIGN PATENT DOCUMENTS

| | | | | |
|---|---|---|---|---|
| EP | 2549288 | | 1/2013 | |
| GB | 2226466 | A1 * | 6/1990 | ............ G01S 7/491 |
| GB | 2293067 | A | 3/1996 | |
| JP | H1185981 | | 3/1999 | |

OTHER PUBLICATIONS

Ian R Mancehster et al: "Method for Optical-Flow-Based Precision Missile Guidnace" IEEE Transactions on Aerospace and Electronic Systems, IEE Service Center, Piscataway, NJ, US, vol. 44, No. 3, Jul. 1, 2008, pp. 835-851, XP011236630, ISSN: 0018-9251, DOI: 10.1109/TAES.2008.4655347 *The Whole Document*.

Captain Tyan Pendleton, "Application of Optic Flow to Missiles" Precision Guidance of Small Diameter Missiles Workshop, Apr. 25, 2001 Bob Jones Auditorium, Redstone Arsenal, Alabama http://www.dtic.mil/dtic/tr/fulltext/u2/a397228.pdf.

* cited by examiner

MISSILE SYSTEM WITH NAVIGATION CAPABILITY BASED ON IMAGE PROCESSING

FIELD AND BACKGROUND OF THE INVENTION

The present invention relates to electro-optic guided missile systems and, in particular, it concerns systems and methods providing enhanced navigation capabilities based on ego-motion processing of seeker images.

It is known to provide tactical surface-to-surface an air-to-surface guided missiles with a gimbaled imaging sensor to provide target tracking capabilities. A tracking subsystem receives images from the imaging system and tracks a target object towards which the missile navigates. Such missiles may carry anti-tank warheads and various other types of warhead. Examples of such missiles which are commercially available include the Lockheed Martin "Javelin" missile (US), the MBDA "Pars 3" missile (Germany), and the Rafael "Spike" missile family (Israel). These missiles typically operate in a "fire-and-forget" mode in which they are locked onto a visible target prior to launch and need no further intervention during their flight to the target. In some cases, a "fire, observe and update" functionality is provided according to which an operator observes images from the missile seeker, relayed via a trailing optical fiber or wirelessly, and can select, correct or switch the target designation during flight. These missiles typically do not have geographical navigation capabilities, instead relying solely on visually designated targets.

Missiles with "fire-and-forget" functionality are limited to use against targets for which there is a direct line of sight (LOS) from the launcher to the target, putting out of reach potential targets that are obscured from view by intervening objects or topography. Where "fire, observe and update" functionality is available, it is possible to launch the missile towards a temporary "target" in the same general direction of an obscured target and then update the target designation during flight when the real target comes into view. However, directing a missile towards an obscured target in this manner is a challenging task, with much potential for error. There are also many scenarios in which it would be useful to select a target based upon information provided in world coordinates.

There is therefore a need for a system and method for providing navigation functionality to short and medium range electro-optic missiles without requiring inclusion of dedicated navigation system hardware on each missile.

SUMMARY OF THE INVENTION

The present invention is a missile system and corresponding method for operating a guided missile.

According to the teachings of the present invention there is provided, a missile system comprising: (a) a missile; (b) a seeker located at a nose portion of the missile, the seeker comprising an electro-optic imaging sensor; and (c) a control arrangement for steering the missile along a flight path to a target, characterized in that the missile system further comprises: (d) a navigation subsystem receiving images from the imaging sensor, the navigation subsystem being configured to: (i) co-process a plurality of the images from the imaging sensor to derive ego-motion of the missile relative to a region viewed by the imaging sensor; (ii) derive from the ego-motion a calculated target direction from the missile to a target.

According to a further feature of an embodiment of the present invention, the seeker further comprises a gimbal arrangement supporting the imaging sensor so as to be movable relative to a body of the missile.

According to a further feature of an embodiment of the present invention, the control arrangement comprises: (a) a tracking subsystem receiving images from the imaging sensor, the tracking system configured to track a target in the images and to determine a tracked target direction; and (b) a guidance subsystem operable to steer the missile towards the tracked target based on a guidance algorithm on the basis of the tracked target direction.

According to a further feature of an embodiment of the present invention, the navigation subsystem is configured to provide the calculated target direction to the guidance subsystem during at least part of a flight of the missile as a substitute for the tracked target direction for use in the guidance algorithm.

According to a further feature of an embodiment of the present invention, the navigation subsystem is further configured to align a current tracked target direction of the tracking subsystem with the calculated target direction during at least part of a flight of the missile.

According to a further feature of an embodiment of the present invention, the navigation subsystem is further configured to actuate the tracking subsystem to perform an automated search within a region around the calculated target direction to acquire a tracked target.

According to a further feature of an embodiment of the present invention, the navigation subsystem is further configured to: (a) determine from the ego-motion an object-distance corresponding to a distance from the missile to an object appearing in an image from the imaging sensor along the direction-to-target; (b) determine a target-distance corresponding to a distance from a current position of the missile to the target; and (c) compare the object-distance with the target-distance to determine whether the target is obscured.

According to a further feature of an embodiment of the present invention, there is also provided a remote operator station including a display, an operator input device and components of a communication subsystem for communicating with components of a communication subsystem within the missile, the remote operator station receiving and displaying images from the imaging sensor, and receiving control inputs via the operator input device for modifying operation of the missile.

According to a further feature of an embodiment of the present invention, the navigation subsystem is configured to generate a visual prompt for display on the display, the visual prompt being derived from the calculated target direction, to facilitate identification of a target by the operator.

According to a further feature of an embodiment of the present invention, the navigation subsystem is further configured to generate a boundary of a region of uncertainty around a target location for display on the display.

According to a further feature of an embodiment of the present invention, the navigation subsystem further comprises a data storage device for storing, prior to launch of the missile, data corresponding to: (a) coordinates of a geographical location of the missile; (b) orientation angles of the missile; and (c) coordinates of a target location.

According to a further feature of an embodiment of the present invention, the data storage device further stores data corresponding to a range to a location corresponding to a pixel within an image sampled by the imaging sensor prior to launch.

There is also provided according to the teachings of an embodiment of the present invention, a method for operating a guided missile having a seeker including an electro-optic imaging sensor, the method comprising the steps of: (a) receiving a dataset sufficient to define a position of a target relative to the launching position and launching orientation of the missile, and data sufficient to determine an ego-motion scaling factor; (b) from launch during flight of the missile, performing ego-motion processing on a plurality of image frames from the imaging sensor so as to derive a position of the missile; and (c) deriving a calculated target direction from a current position of the missile to the target.

According to a further feature of an embodiment of the present invention, the plurality of images are derived from a gimbaled imaging sensor.

According to a further feature of an embodiment of the present invention, during at least part of the flight of the missile: (a) tracking algorithms are applied to a sequence of images from the imaging sensor to track a target; and (b) the missile is steered towards the target tracked by the tracking algorithms.

According to a further feature of an embodiment of the present invention, during a first part of a flight of the missile, the missile is steered based on the calculated target direction.

According to a further feature of an embodiment of the present invention, the seeker is controlled to generate images sampled in a direction corresponding to the calculated target direction for input to the tracking algorithms.

According to a further feature of an embodiment of the present invention, an automated search is performed with the seeker within a region around the calculated target direction to acquire a tracked target.

According to a further feature of an embodiment of the present invention: (a) an object-distance corresponding to a distance from the missile to an object appearing in an image from the imaging sensor along the calculated target direction is determined from the ego-motion processing; (b) a target-distance corresponding to a distance from the position of the missile to the target is determined; and (c) the object-distance is compared with the target-distance to determine whether the target is obscured.

According to a further feature of an embodiment of the present invention, images from the imaging sensor are displayed to a remote operator and control inputs are received via an operator input device for modifying operation of the missile.

According to a further feature of an embodiment of the present invention, a visual prompt is generated for display to the remote operator, the visual prompt being derived from the calculated target direction, to facilitate identification of a target by the operator.

According to a further feature of an embodiment of the present invention, a boundary of a region of uncertainty around a target location is generated for display to a remote operator.

According to a further feature of an embodiment of the present invention, the dataset includes: (a) coordinates of a geographical location of the missile; (b) orientation angles of the missile; and (c) coordinates of a target location.

According to a further feature of an embodiment of the present invention, the data sufficient to determine an ego-motion scaling factor comprises a range to a location corresponding to a pixel within an image sampled by the imaging sensor prior to launch.

According to a further feature of an embodiment of the present invention, the ego-motion processing is performed by at least one processing system located within the missile.

According to a further feature of an embodiment of the present invention, the ego-motion processing is performed by at least one processing system located remotely from the missile.

According to a further feature of an embodiment of the present invention, the missile is configured to operate without an onboard inertial navigation system and without onboard satellite positioning signal sensors.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a missile system and corresponding method which employ ego-motion processing of seeker images to provide navigation capabilities.

The principles and operation of missile systems and methods according to the present invention may be better understood with reference to the drawings and the accompanying description.

OVERVIEW

Figure 1:
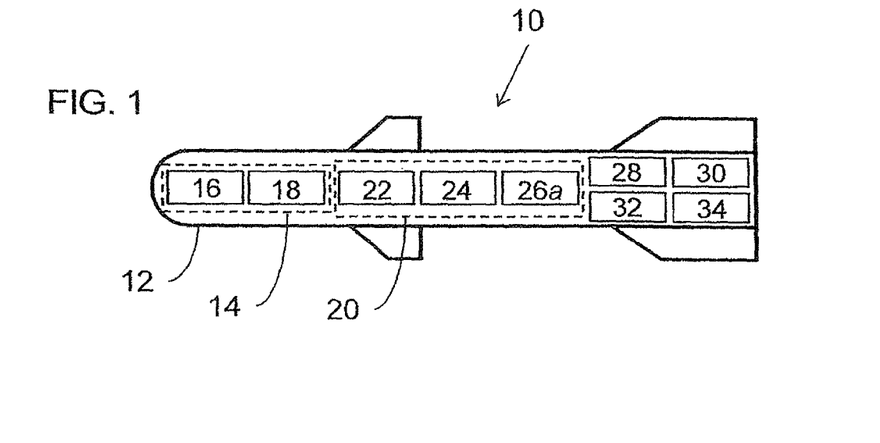
FIG. 1 is a schematic representation of a missile, constructed and operative according to an embodiment of the present invention.
Figure 2:
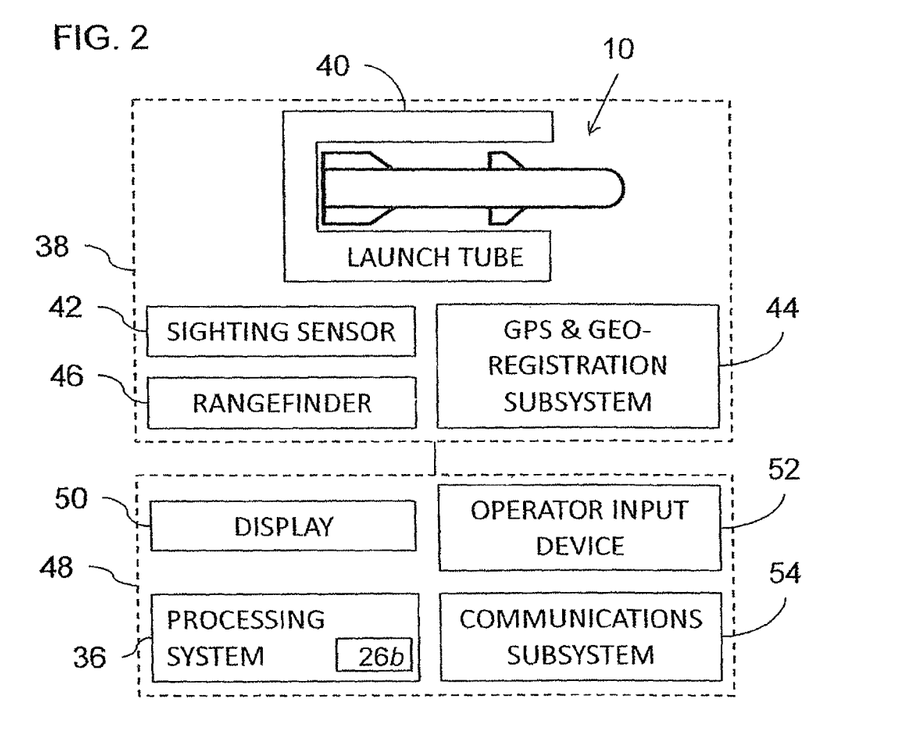
FIG. 2 is a block diagram of a missile system, constructed and operative according to an embodiment of the present invention, including the missile of FIG. 1.

Referring now to the drawings, FIGS. 1 and 2 show aspects of a missile system, constructed and operative according to an embodiment of the present invention. Generally speaking, the missile system includes a missile 10 having a missile body 12 containing a seeker 14. Seeker 14, typically located at a nose portion of missile 10, includes an electro-optic imaging sensor 16. A control arrangement (various options to be described below) allows steering (manual or autonomous) of missile 10 along a flight path to a target. Most preferably, the invention relates to tactical missiles which are configured to operate without an onboard inertial navigation system and without onboard satellite positioning signal sensors, instead relying on images from the electro-optic imaging sensor 16 as a basis for guidance of the missile, manually or autonomously, towards the target.

In this context, the present invention supplements the functionality of the missile by providing navigation functionality based upon ego-motion processing of images from seeker 14, thereby facilitating reliable navigation of missile 10 towards an initially obscured or otherwise non-trackable target location until the target becomes visible, or towards a target which is designated by its relative or real-world coordinates rather than by its location on the video.

To this end, the missile system of the present invention further includes a navigation subsystem receiving the images from imaging sensor 16. The navigation subsystem may be implemented as an onboard navigation subsystem 26a, which is part of an onboard processing system 20, or as a remote navigation subsystem 26b, which is part of a remote processing system 36 (shown in FIG. 2 and described further below), or may be distributed between the onboard and remote systems. The navigation subsystem 26a and/or 26b are configured to co-process images from imaging sensor 16 to derive ego-motion of the missile body relative to a region viewed by the imaging sensor, and to derive from the ego-motion a calculated target direction from the missile to a target.

At this stage, it will already be appreciated that the present invention makes a major contribution to the functionality of tactical electro-optic missiles. Specifically, by use of ego-motion processing applied to images derived from the seeker imaging sensor, the present invention provides navigation capabilities to what is typically a relatively low-cost missile without requiring addition of dedicated hardware components such as are typically used in more expensive missiles, and without dependence on GPS during flight. This and other advantages of the present invention will be better understood with reference to the drawings and the following detailed description.

Ego-Motion Processing

The underlying principles of ego-motion processing of images taken by a single camera travelling relative to a three-dimensional scene are known and well documented. For example, details of suitable processing techniques may be found in common textbooks, or in US Pre-Grant Patent Application Publication No. US 2009/0285450 to Kaiser et al., and a related PhD. dissertation entitled "Vision-Based Estimation, Localization, and Control of an Unmanned Aerial Vehicle" (Michael Kent Kaiser, University of Florida, 2008). For conciseness of presentation, standard technical details regarding how to implement ego-motion processing will not be reproduced herein.

Ego motion processing essentially tracks the apparent motion of stationary features appearing in two or more views from different locations, and derives the motion of the camera relative to the tracked features. Where the area viewed by the imaging sensor changes significantly, daisy-chaining of pose estimations can be used to determine new positions relative to features which have now passed from view.

The implementation of ego-motion processing for navigating an aerial vehicle as described in the above-referenced documents employs a camera with a wide field of view rigidly fixed to the airframe of the aerial vehicle to as to point generally perpendicular to the direction of travel. These parameters (rigidly fixed camera, wide field of view, and directed perpendicular to direction of travel) reflect the common assumptions of optimized working parameters: a downwards or sideways viewing direction ensures sufficient relative motion to facilitate ego-motion derivation; a wide field of view ensures coverage of sufficient trackable features within the field of view; and a rigidly mounted camera to ensure one-to-one mapping between the derived camera position and the position of the aerial vehicle airframe.

In contrast to the above, the imaging sensor of an electro-optic missile seeker is typically a narrow field-of-view sensor (typically less than 15° viewing angle, and often less than about 5°) which is typically dynamically mounted on a gimbal arrangement relative to the missile body, and which looks in a generally forward direction towards the region of a target. The present invention teaches that the imaging sensor of an electro-optic missile seeker, despite being far from the above assumed-optimal parameters, has surprisingly been found to be a very effective basis for ego-motion processing.

Ego motion processing determines movement of an imaging device relative to features within the field of view, subject to a scaling factor, but cannot be used for absolute navigation in the physical world without some external data available to anchor the derived camera pose in the real world and to derive the scaling factor. For this reason, most implementations of navigation systems employing ego motion processing combine the technique with at least one additional modality of navigation, such as GPS sensors, image matching and/or inertial navigation systems.

In contrast to the above, certain particularly preferred implementations of the present invention employ ego motion processing as a sole navigation modality, deriving real world coordinates from data provided prior to launch, and deriving the scaling factor either from pre-launch data or from measurements taken immediately after launch. There are a number of options for the source and content of the pre-launch data and scaling factor data, as will be discussed below. This navigation modality is optionally supplemented by a tracking-based homing modality which takes over control of missile steering during closing stages of a flight path to the target. It should be noted in this context that the term "navigation" is used herein to refer to control of the path of the missile to guide it to a defined relative or real-world location, whereas "horning" is used herein to refer to control of the path of the missile to close on a tracked target.

Exemplary System Details

Turning now to further details of a particularly preferred but non-limiting example of the missile system of the present invention, FIG. 1 shows schematically various components of an implementation of missile 10 while FIG. 2 shows schematically other components of an implementation of the missile system.

Referring first to missile 10, imaging sensor 16 is typically a thermal imaging camera, which may be cooled or uncooled. Additionally or alternatively, a camera sensitive to visible and/or near IR may be used. Imaging sensor 16 is typically supported by a gimbal arrangement 18 so as to be movable relative to missile body 10, as is common practice in electro-optic missiles. The gimbal arrangement may be a two-axis or three-axis gimbal arrangement, and may employ various geometrical arrangements of the gimbal axes suitable for use against stationary or slow-moving targets, as is well known in the art.

According to certain implementations, missile 10 also includes an onboard processing system 20, including one or more processor (not shown) and data storage components (not shown), configured to provide a tracking subsystem 22 for tracking an object in images received from the imaging sensor and generating a tracked target direction. In certain configurations, tracking subsystem 22 provides closed loop control of gimbal arrangement 18 to maintain imaging sensor 16 aligned with a tracked target, such that the gimbal angles themselves define the tracked target direction. Onboard processing system 20 also typically provides a guidance subsystem 24 configured to actuate steering actuators (typically electro-mechanical actuators linked to aerodynamic control surfaces or pyrotechnic steering actuators 28) to guide missile 10 along a flight path to a target based at least in part on the tracked target direction. Missile 10 also typically includes a payload 30, one or more stages of a propulsion system 32, and optionally components of a wired or wireless communications subsystem 34. Although illustrated herein in the context of a missile with onboard tracking and guidance capabilities, it should be noted that the invention is also applicable to a remotely controlled missile without onboard tracking and guidance capabilities.

Turning now to FIG. 2, according to the exemplary implementation illustrated here, missile 10 is deployed prior to launch in a launcher 38 which includes a canister (interchangeably referred to as a "launch tube") 40. Canister 40 may be of any conventional type, and may be configured for mounting on a vehicle (terrestrial or aerial), for shoulder launching, or may be free-standing. Launcher 38 optionally includes a sighting sensor 42, which typically includes an imaging sensor of similar type to imaging sensor 16, possibly with different zoom settings, used to identify and select a target before switching to the missile seeker view.

As mentioned above, while navigation based on ego-motion relative to the launcher position may be useful in various scenarios, certain preferred implementations of the present invention provide functionality for navigation to a real-world coordinate location. For this purpose, the navigation subsystem 26a and/or 26b is preferably initiated prior to launch with the geographical starting position and orientation of the missile. The source of this information is not critical to the present invention, and it may be provided or derived in various ways. By way of non-limiting example, launcher 38 is shown here with a subsystem 44 including components such as a GPS (or equivalent) receiver and/or a system for geographic registration for deriving the position and orientation of the launcher, and hence also the missile, prior to launch. In one implementation, geographic location may be determined by GPS, and angular orientation may be determined by use of a digital compass and a digital level sensor. Additionally, or alternatively, manual or automated triangulation techniques relative to other permanent or temporary known location reference points may be used, supported by suitable hardware, as is known in the art. Additionally, or alternatively, an imaging or ranging system can be used to determine or refine determination of the launcher position and orientation relative to sighted landmarks or geographic features identified, manually or automatically, in a geographic database including a digital terrain map (DTM). All of the above techniques, as well as the hardware required to support them, are well known, and will not be discussed here in detail. The derived location and orientation data is preferably provided to the navigation subsystem 26a and/or 26b prior to launch, together with the target location data which is typically provided from an external source.

Also as mentioned above, navigation on the basis of ego-motion processing requires determination of a scaling factor. The scaling factor can conveniently be derived by obtaining knowledge of the distance of a single feature viewed by seeker imaging sensor 16, or alternatively, by knowing the instantaneous velocity of the missile at one point during flight. In certain implementations, launcher 38 further includes a rangefinder 46 for this purpose, enabling determination of a distance from the launcher to a reference point within a region initially viewed by seeker imaging sensor 16. This however is only one of a number of implementation options. Where geo-registration is performed by scene matching or otherwise registering images to a geographic database, range information to one or more landmarks corresponding to known pixels in the seeker image may be available without requiring separate rangefinder hardware. Rangefinder 46 may also be used, or replaced by a suitable Doppler sensor, to determine the missile velocity at a certain time after launch, typically as early as practical in the flight, and the measured velocity transferred to the navigation subsystem to be employed to derive the scaling factor. In certain implementations, it may be sufficient to employ an estimation of missile velocity based on the known parameters of the missile design together with calculated adjustments for factors relating to the launch conditions, primarily the elevation angle. Other options for deriving the scaling factor may use measurements of missile acceleration, or may derive the scaling factor by detecting an object of known dimensions within the sampled images.

Thus, by one technique or another, a data storage component of the navigation subsystem preferably stores, prior to launch of the missile, data corresponding to: (a) coordinates of a geographical location of the missile; (b) orientation angles of the missile; and (c) coordinates of a target location. Where range data is used to determine the scaling factor, the data storage component preferably further stores data corresponding to a range to a location corresponding to a pixel within an image sampled by imaging sensor 16 prior to launch.

In certain applications, the missile system of the present invention further includes a remote operator station 48, which may either be integrated with launcher 38 or may be located separately therefrom. Remote operator station 48 preferably includes a display 50, an operator input device 52 (such as a joystick) and components of a communication subsystem 54 for communicating with components of communication subsystem 34 within missile 10 (FIG. 1), typically either by trailing optical fiber or by wireless communication, all as is known in the art. Remote operator station 48 receives and displays images from imaging sensor 16, and receives control inputs from an operator via operator input device 52 for modifying operation of the missile. Remote operator station 48 may in some cases be used for full manual control of the flight of missile 10, or may be employed in a "fire, observe and update" modality, allowing the operator to select, correct or switch target designation during flight.

For implementations with an operator in the loop, navigation subsystem 26a and/or 26b may generate a visual prompt for display on display 50. The visual prompt is derived from the calculated target direction and indicates to the operator where the target location appears in the viewed image, thereby facilitating identification of the target by the operator. In particular, when navigating towards an initially obscured target, provision of a visual prompt indicating the calculated target direction greatly reduces the risk of incorrect designation of the target when it comes into view. In some cases, when the calculated direction to target lies outside the currently viewed region, the visual prompt is preferably in the form of an indication to the operator showing in which direction to steer the seeker in order to bring the target location into view.

In some cases, the visual prompt may include an indication of a boundary of a region of uncertainty around a target location for display on the display. The boundary of a region of uncertainty in the navigation precision can be derived empirically during testing of the systems under a range of different operating conditions. Additionally or alternatively, a boundary of a region of uncertainty may be calculated based upon various measures of reliability of the ego motion solution derived from the calculation itself, taking into consideration other sources of uncertainty, such as the accuracy of measured locations and angles of the launch position and measurements on which the scaling factor and target location are based. One possible approach for quantitative assessment of reliability may be found in a paper "Uncertainty Modeling for Optimal Structure from Motion" (Daniel Morris et al., *Vision Algorithms Theory and Practice*, September, 1999).

In certain particularly preferred embodiments of the present invention, in addition to, or instead of, the generation of various visual prompts, the calculated direction to target generated by navigation subsystem 26a and/or 26b is used to directly control operation of missile 10. According to one preferred option, navigation subsystem 26a and/or 26b is configured to provide the calculated target direction to the guidance subsystem during at least part of a flight of the missile for use directly in a guidance algorithm such that missile 10 navigates along a flight path to the target.

Additionally, or alternatively, navigation subsystem 26a and/or 26b may be further configured to align a current tracked target direction of the tracking subsystem with the calculated target direction so that the seeker imaging sensor 16 looks towards the target. In order to ensure sufficient continuity of tracked features within successive imaging sensor images to maintain continuity of the ego motion tracking, movement of the gimbal arrangement 18 is performed gradually. Automatic alignment of seeker 14 towards the target facilitates reliable manual acquisition of the intended target by an operator at remote operator station 48. Additionally, or alternatively, navigation subsystem 26a and/or 26b is further configured to actuate missile tracking subsystem 22 to perform an automated search within a region around the calculated target direction to acquire a tracked target. The system preferably makes use of the aforementioned region of uncertainty around the calculated target direction to define a limited region within which the automated target search is performed, thereby reducing complexity of the automated search task. Various algorithms for automated target acquisition from video images are well known in the art, typically based on object recognition algorithms. The automatically acquired target may be displayed as a suggestion to an operator for operator confirmation or, where sufficient precision of navigation and reliability of target acquisition can be achieved, may be a basis for a fire-and-forget mode of operation, even for obscured targets.

A further valuable feature which can be implemented when seeker 12 is aligned so that the field of view includes the calculated target direction is automated detection of whether an obscured target is still obscured or has been revealed due to the movement of the missile. Specifically, the ego-motion processing allows the navigation subsystem to derive an object-distance corresponding to a distance from the missile to an object appearing in an image from the imaging sensor along the direction-to-target. The navigation subsystem also tracks the current position of the missile and knows the target location, thereby allowing calculation of a target-distance corresponding to a distance from a current position of the missile to the target. The object-distance is then compared with the target-distance to determine whether the target is currently obscured or revealed. If the object-distance is significantly less than the target-distance, the viewed object is clearly still an obscuring object and not the target itself.

Figure 3:
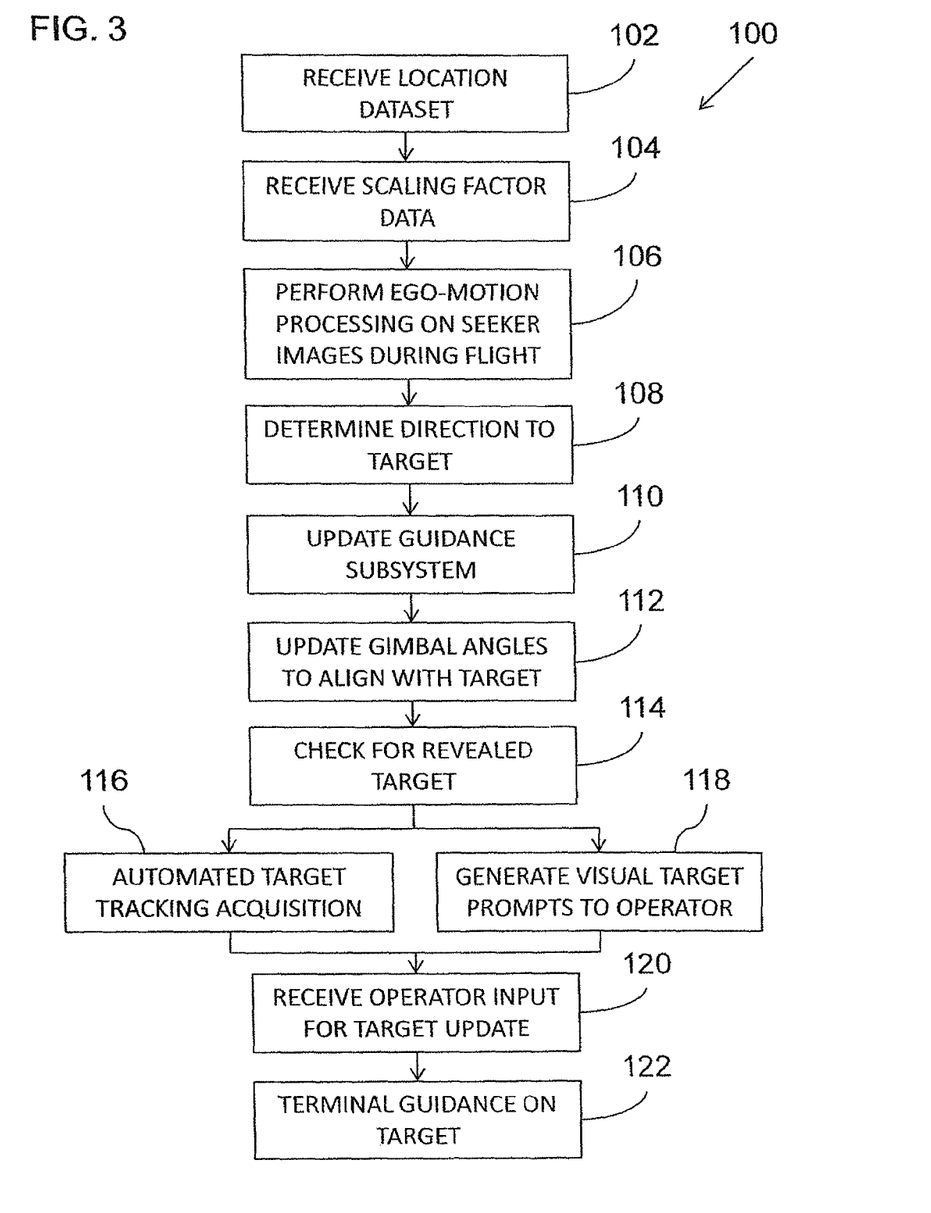
FIG. 3 is a flow diagram illustrating operation of the missile system of FIG. 2 according to an implementation of a method according to the present invention.

Turning now to FIG. 3, this illustrates an example of operation of a missile system according to an embodiment of the present invention, corresponding also to an implementation of a method according to the present invention, generally designated 100, illustrating a selection of the features described above.

Specifically, at step 102, the missile system receives a dataset sufficient to define a position of a target relative to the launching position and launching orientation of the missile, most preferably in terms of real-world coordinates and angles of the launcher and real-world coordinates of the target. Some of the data may be "received" from various devices integrated with launcher 38, as described above. At step 104, the system also receives data sufficient to determine an ego-motion scaling factor, typically through determining a distance to an object corresponding to a pixel of the seeker image, or through determining a velocity of the missile after launch by measurement or calculation.

From launch during flight of the missile, the system performs ego-motion processing on a plurality of image frames from the imaging sensor so as to derive a position of the missile (step 106), and derives a calculated target direction from a current position of the missile to the target (step 108). The calculated target direction is then used in one or more manner for the purpose of correcting a flight path of the missile to the target. Thus, according to one option, the calculated target direction is used directly as a basis for the guidance subsystem for navigating the missile to the target (step 110). In certain implementations, steps 106-110 may be performed throughout the flight of the missile to provide autonomous fire-and-forget functionality based only on ego-motion navigation.

Additionally, or alternatively, the navigation subsystem controls gimbal arrangement 18 to gradually align (or continuously realign) imaging sensor 16 with the calculated target direction (step 112). This can optionally be used as an alternative to direct integration with the missile guidance system, particularly where the guidance system is configured to implement homing guidance based on the target tracking angles derived from the gimbals.

After alignment of the imaging sensor with the calculated target direction, the missile system can perform one or more of a number of functions including: checking whether the target is obscured or revealed (step 114); activating automated target acquisition (step 116); and in the case of a remote operator station 48, generating visual prompts to indicate calculated target position, or a region of uncertainty around the target, to an operator (step 118), all as detailed above.

Where an operator is in the loop via remote operator station 48, the system can receive inputs from the operator to update the target designation if necessary (step 120). The missile system then typically continues with terminal guidance towards the target (step 122), typically by applying tracking algorithms to a sequence of images from the imaging sensor to track a target, and steering the missile towards the target tracked by the tracking algorithms.

It will be appreciated that various implementations of the present invention are particularly advantageous in providing enhanced navigation functionality for existing missiles currently without such functionality. For example, electro-optic missiles which are currently either remotely manually controlled or which provide "fire, observe and update" functionality can typically be provided with navigation-based visual prompts and/or automatic guidance to a geographic target simply by modification of the remote controller station 48, without requiring any change to the hardware of the missile, and in most cases, without even modifying the software of the missile itself.

To the extent that the appended claims have been drafted without multiple dependencies, this has been done only to accommodate formal requirements in jurisdictions which do not allow such multiple dependencies. It should be noted that all possible combinations of features which would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A missile system comprising:
   (a) a missile;
   (b) a seeker located at a nose portion of said missile, said seeker including an electro-optic imaging sensor; and
   (c) a control arrangement for steering the missile along a flight path to a target, said control arrangement comprising:
      (i) a tracking subsystem receiving images from said imaging sensor, said tracking system configured to track a target in said, images and to determine a tracked target direction, and
      (ii) a guidance subsystem operable to steer the missile towards the tracked target based on a guidance algorithm on the basis of said tracked target direction,
   characterized in that the missile system further comprises:
   (d) a navigation subsystem receiving images from said imaging sensor, said navigation subsystem being configured to:
      (i) co-process a plurality of said images from said imaging sensor to derive ego-motion of said missile relative to a region viewed by said imaging sensor;
      (ii) derive from said ego-motion a calculated target direction from said missile to a target.

2. The missile system of claim 1, wherein said seeker further comprises a gimbal arrangement supporting said imaging sensor so as to be movable relative to a body of said missile.

3. The missile system of claim 1, wherein said navigation subsystem is further configured to:
   (a) determine from said ego-motion an object-distance corresponding to a distance from the missile to an object appearing in an image from said imaging sensor along the direction-to-target;
   (b) determine a target-distance corresponding to a distance from a current position of the missile to the target; and
   (c) compare said object-distance with said target-distance to determine whether the target is obscured.

4. The missile system of claim 1, further comprising a remote operator station including a display, an operator input device and components of a communication subsystem for communicating with components of a communication subsystem within said missile, said remote operator station receiving and displaying images from said imaging sensor, and receiving control inputs via said operator input device for modifying operation of said missile.

5. The missile system of claim 4, wherein said navigation subsystem is configured to generate a visual prompt for display on said display, said visual prompt being derived from said calculated target direction, to facilitate identification of a target by the operator.

6. The missile system of claim 4, wherein said navigation subsystem is further configured to generate a boundary of a region of uncertainty around a target location for display on said display.

7. The missile system of claim 1, wherein said navigation subsystem further comprises a data storage device for storing, prior to launch of said missile, data corresponding to:
   (a) coordinates of a geographical location of the missile;
   (b) orientation angles of the missile; and
   (c) coordinates of a target location.

8. The missile system of claim 7, wherein said data storage device further stores data corresponding to a range to a location corresponding to a pixel within an image sampled by said imaging sensor prior to launch.

9. The missile system of claim 1, wherein said missile is configured to operate without an onboard inertial navigation system and without onboard satellite positioning signal sensors.

10. The missile system of claim 1, further comprising components of a communications subsystem located in said missile and configured for transmitting images from said imaging sensor for display to a remote operator and receiving control inputs from the remote operator for modifying operation of said missile.

11. A method for operating a guided missile having a seeker including an electro-optic imaging sensor, the method comprising the steps of:
   (a) receiving a dataset defining a position of a target relative to the launching position and launching orientation of the missile, and data indicative of an ego-motion scaling factor;
   (b) from launch during flight of the missile, performing ego-motion processing on a plurality of image frames from the imaging sensor of the seeker so as to derive a position of the missile;
   (c) deriving a calculated target direction from a current position of the missile to the target, and
   (d) during at least part of the flight of the missile:
      (i) applying tracking algorithms to a sequence of images from the imaging sensor to track a target; and
      (ii) steering the missile towards the target tracked by said tracking algorithms.

12. The method of claim 11, wherein the plurality of images are derived from a gimbaled imaging sensor.

13. The method of claim 11, further comprising:
   (a) determining from said ego-motion processing an object-distance corresponding to a distance from the missile an object appearing in an image from said imaging sensor along the calculated target direction;
   (b) determining a target-distance corresponding to a distance from the position of the missile to the target; and
   (c) comparing said object-distance with said target-distance to determine whether the target is obscured.

14. The method of claim 11, further comprising displaying images from said imaging sensor to a remote operator and receiving control inputs via an operator input device for modifying operation of said missile.

15. The method of claim 14, further comprising generating a visual prompt for display to the remote operator, said visual prompt being derived from said calculated target direction, to facilitate identification of a target by the operator.

16. The method of claim 14, further comprising generating a boundary of a region of uncertainty around a target location for display to a remote operator.

17. The method of claim 11, wherein said dataset includes:
   (a) coordinates of a geographical location of the missile;
   (b) orientation angles of the missile; and
   (c) coordinates of a target location.

18. The method of claim 11, wherein said data sufficient to determine an ego-motion scaling factor comprises a range to a location corresponding to a pixel within an image sampled by the imaging sensor prior to launch.

19. The of claim 11, wherein the missile is configured to operate without an onboard inertial navigation system and without onboard satellite positioning signal sensors.

* * * * *